US010998997B2

(12) United States Patent
Nammi et al.

(10) Patent No.: US 10,998,997 B2
(45) Date of Patent: *May 4, 2021

(54) NON-ORTHOGONAL MULTIPLE ACCESS FOR UPLINK DATA TRANSMISSION FOR 5G OR OTHER NEXT GENERATION NETWORK

(71) Applicant: AT&T Intellectual Property I, L.P., Atlanta, GA (US)

(72) Inventors: SaiRamesh Nammi, Kista (SE); Arunabha Ghosh, Austin, TX (US); Saeed Ghassemzadeh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,522

(22) Filed: Apr. 16, 2020

(65) Prior Publication Data

US 2020/0244385 A1 Jul. 30, 2020

Related U.S. Application Data

(63) Continuation of application No. 15/977,730, filed on May 11, 2018, now Pat. No. 10,666,374.

(51) Int. Cl.
*H04L 5/00* (2006.01)
*H04W 72/04* (2009.01)
(Continued)

(52) U.S. Cl.
CPC ............. *H04J 13/16* (2013.01); *H04B 1/707* (2013.01); *H04L 5/0053* (2013.01); *H04W 72/042* (2013.01)

(58) Field of Classification Search
CPC .......................... H04W 72/042; H04L 5/0053
(Continued)

(56) References Cited

U.S. PATENT DOCUMENTS 5,559,829 A  9/1996 Le Strat et al.
5,631,922 A  5/1997 Sekine et al.
(Continued)

FOREIGN PATENT DOCUMENTS

JP          5830478 B2    12/2015
KR   10-2016-0118992 A    10/2016
(Continued)

OTHER PUBLICATIONS

Dai et al., "Non-orthogonal multiple access for 5G: solutions, challenges, opportunities, and future research trends", IEEE Communications Magazine 53.9, 2015, pp. 74-81.
(Continued)

*Primary Examiner* — Angel T Brockman
(74) *Attorney, Agent, or Firm* — Amin, Turocy & Watson, LLP

(57) ABSTRACT

The gains with non-orthogonal multiple access (NOMA) for uplink data transmissions can be high when chosen codes are orthogonal. However, when codes are non-orthogonal, the gains can be low. NOMA can be used when there is more than one mobile device using the same resources. Since orthogonal codes cannot be possible for every length, codes which have low cross-correlation properties can be used. However, when there are a large number of mobile devices using the same resources, the cross-correlation between the codes can cause interference to the mobile devices. Reducing the gains of a NOMA system can reduce the overall throughput. Thus, transmitting data on the same resources in a NOMA can occur in spite of the interference to the UEs transmitting data on the same resources. Therefore, a non-orthogonal multiple access design for a 5G network can mitigate interference.

20 Claims, 12 Drawing Sheets

(51) Int. Cl.
*H04J 13/16* (2011.01)
*H04B 1/707* (2011.01)

(58) Field of Classification Search
USPC .......................................................... 370/320
See application file for complete search history.

(56) References Cited

U.S. PATENT DOCUMENTS

| | | | |
|---|---|---|---|
| 6,195,343 | B1 | 2/2001 | Watanabe |
| 6,266,331 | B1 | 7/2001 | Baker et al. |
| 6,452,936 | B1 | 9/2002 | Shiino |
| 6,728,225 | B1 | 4/2004 | Ozluturk |
| 9,713,161 | B2 | 7/2017 | Kishiyama |
| 9,930,671 | B2 | 3/2018 | Kusunoki |
| 2006/0094468 | A1 | 5/2006 | Hoshino et al. |
| 2008/0144493 | A1 | 6/2008 | Yeh |
| 2009/0175258 | A1 | 7/2009 | Wang et al. |
| 2012/0236909 | A1 | 9/2012 | Ma et al. |
| 2013/0308451 | A1 | 11/2013 | Townend et al. |
| 2016/0212748 | A1 | 7/2016 | Yang et al. |
| 2017/0013619 | A1 | 1/2017 | Li et al. |
| 2018/0048348 | A1 | 2/2018 | Gau et al. |
| 2018/0063820 | A1 | 3/2018 | Xiong et al. |
| 2018/0070265 | A1 | 3/2018 | Seo et al. |
| 2019/0349110 | A1* | 11/2019 | Nammi ................. H04J 13/16 |

FOREIGN PATENT DOCUMENTS

| | | |
|---|---|---|
| WO | 2007/023022 A1 | 3/2007 |
| WO | 2017/097227 A1 | 6/2017 |
| WO | 2017/177083 A1 | 10/2017 |
| WO | 2018/012814 A1 | 1/2018 |
| WO | 2018/030121 A1 | 2/2018 |
| WO | 2018/031620 A1 | 2/2018 |
| WO | 2018/032014 A1 | 2/2018 |
| WO | 2018/064062 A1 | 4/2018 |
| WO | 2018/064582 A1 | 4/2018 |

OTHER PUBLICATIONS

Non-Final Office Action received for U.S. Appl. No. 15/977,730 dated Jun. 27, 2019, 24 pages.

* cited by examiner

NON-ORTHOGONAL MULTIPLE ACCESS FOR UPLINK DATA TRANSMISSION FOR 5G OR OTHER NEXT GENERATION NETWORK

RELATED APPLICATION

The subject patent application is a continuation of, and claims priority to, U.S. patent application Ser. No. 15/977,730 (now U.S. Pat. No. 10,666,374), filed May 11, 2018, and entitled "NON-ORTHOGONAL MULTIPLE ACCESS FOR UPLINK DATA TRANSMISSION FOR 5G OR OTHER NEXT GENERATION NETWORK," the entirety of which application is hereby incorporated by reference herein.

TECHNICAL FIELD

This disclosure relates generally to facilitating a non-orthogonal multiple access transmission. For example, this disclosure relates to facilitating a non-orthogonal multiple access for uplink data transmission for a 5G, or other next generation network.

BACKGROUND

5th generation (5G) wireless systems represent a next major phase of mobile telecommunications standards beyond the current telecommunications standards of 4$^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to non-orthogonal multiple access transmission is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
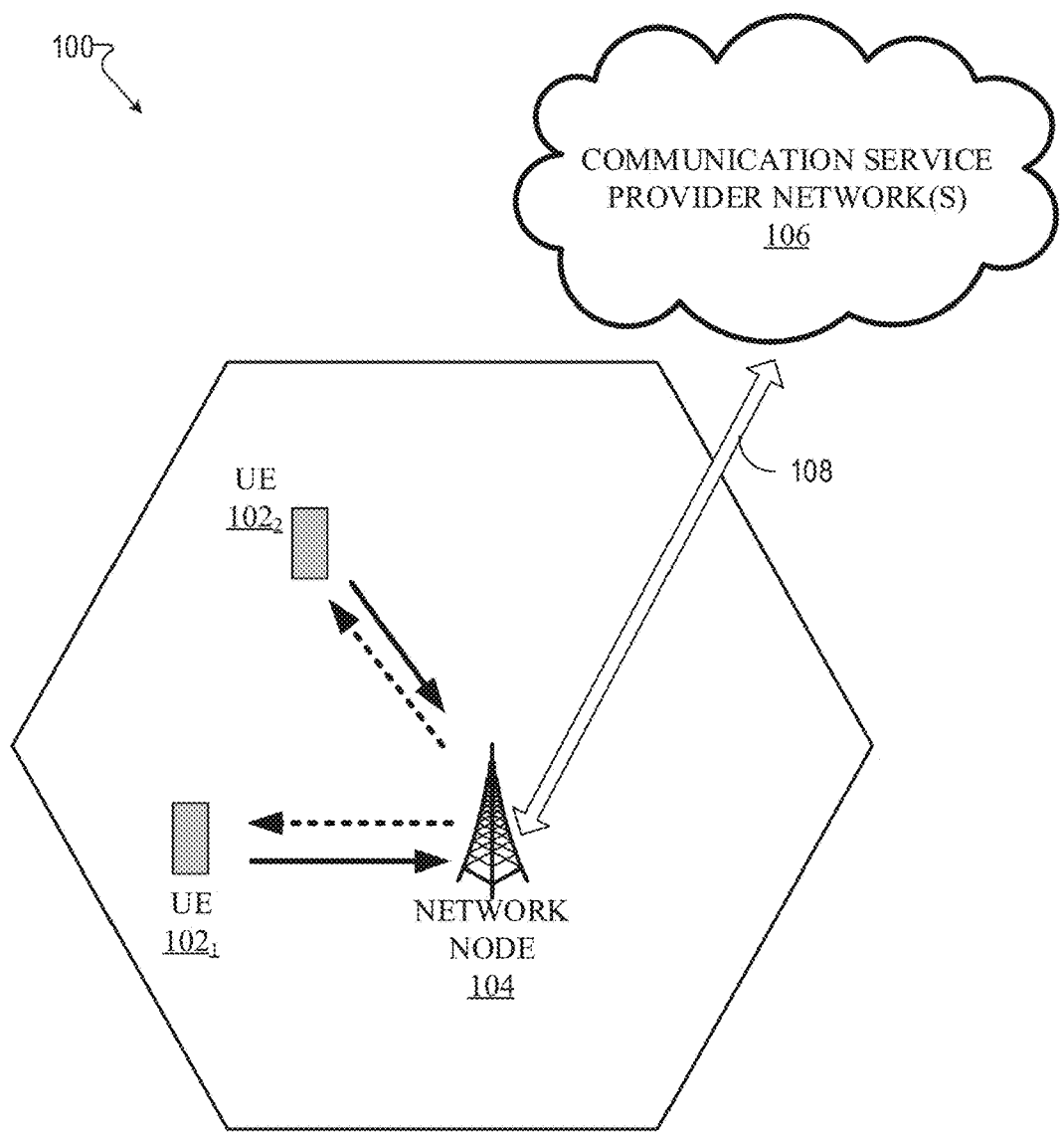
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a non-orthogonal multiple access transmission for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a non-orthogonal multiple access transmission for a 5G network. Facilitating a non-orthogonal multiple access transmission for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

The gains with non-orthogonal multiple access (NOMA) for uplink data transmissions can be high when chosen codes are orthogonal as the interference from the other UEs is zero. However, when codes are non-orthogonal, the gains can be low. NOMA can be used when there is more than one UE using the same resources. For example, at a modulator, symbols can be used to spread different resource elements, and at a receiver, an interference cancelation can be used to cancel interference and facilitate the passage of data. Since perfect orthogonal codes cannot be possible for every length, codes which have low cross correlation properties can be used. However, when there are a large number of UEs, the cross correlation between the codes can cause interference to the UEs transmitting data on the same resources. Thus, reducing the gains of a NOMA system, can reduce the overall throughput. This disclosure conveys a solution for transmitting data on the same resources in NOMA system in spite of the interference to the UEs transmitting data on the same resources.

NR can schedule UEs on orthogonal resources for downlink and uplink data transmissions, which can imply that the gNode B can allocate the UEs on different time-frequency resources. Hence, during transmissions, signals from the UE's cannot interfere, so the network can be able to decode the signals. Improving NR uplink performance can be facilitated by allocating non-orthogonal resources (i.e., more than one UE is scheduled on the same time-frequency resources). The network can use an advanced receiver such as serial interference cancellation to remove interference and to decode the desired signals, thus improving the current NR system capacity.

NOMA can utilize a code domain for multiple access, where different UEs are served with different codes. The UEs with better channel conditions can employ interference cancellation to remove the messages intended for other UEs before decoding their own.

For example, if there is a UE close to the edge of a first cell, whose channel condition is very poor, under conventional NR, an orthogonal bandwidth channel, (e.g., a time slot) can be allocated to the UE, and the other users cannot use this time slot. However, NOMA can allow another user with better channel conditions, of a second cell, into the same time slot. Since the first cell's channel condition is very poor, the interference from the second cell will not cause much performance degradation to the first cell. However, the overall system throughput can be improved since additional information can be delivered between the base station (BS) and the second cell. Thus, rather than using a single code for spreading the information bits, multiple codes can be utilized to spread the signal.

With regards to the network node, a method can comprise determining the spreading codes for a particular UE by: 1) obtaining information about a channel between the UE and the network based on reference signal data; 2) determining the spreading codes for a particular UE based on data allocated to the UE; and 3) communicating a recommendation to the UE comprising a spreading factor. The UE can transmit data to the gNode B after: 1) receiving the recommendation from the gNode B; and 2) determining and/or applying the spreading factor to spread a transmission signal The network and the UE can understand the spreading codes based on a pre-defined spreading code set (e.g., standardized spreading codes), where the network can indicate to the UE the spreading codes either using dynamic signaling and/or using a downlink control channel. In one or more other embodiments, the network can indicate the spreading code set using radio resource control (RRC) signaling and indicate to the UE the spreading factor. Once the UE receives the information or the UE changes its transmission pattern, the data can be spread using multiple spreading codes.

In one embodiment, described herein is a method comprising receiving, by a wireless network device comprising a processor, a reference signal associated with a channel between the wireless network device and a mobile device. Based on the reference signal and a quantity of data to be sent to the mobile device, the method can comprise determining, by the wireless network device, spreading code data representative of one or more spreading codes for the mobile device. Additionally, the method can comprise facilitating, by the wireless network device, sending the spreading code data to the mobile device to be used to spread a transmission signal.

According to another embodiment, based on a reference signal between a mobile device and a network device, a system can facilitate, receiving spreading code data representative of one or more spreading codes to be utilized to spread a transmission signal. In response to the receiving the spreading code data, the system can modify a transmission pattern of the mobile device, resulting in a modified transmission pattern. Furthermore, the system operations can comprise transmitting signal data in accordance with the modified transmission pattern.

According to yet another embodiment, described herein is a machine-readable storage medium that can perform the operations comprising receiving a reference signal associated with a channel between a wireless network device and a mobile device. In response to the receiving the reference signal and based on data to be transmitted to the mobile device, the machine-readable storage medium operations can comprise facilitating determining spreading codes for the mobile device. Additionally, in response to the facilitating the determining of the spreading codes for the mobile device, the machine-readable storage medium can facilitate sending the spreading codes to the mobile device to be used to spread transmission data.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network.

The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
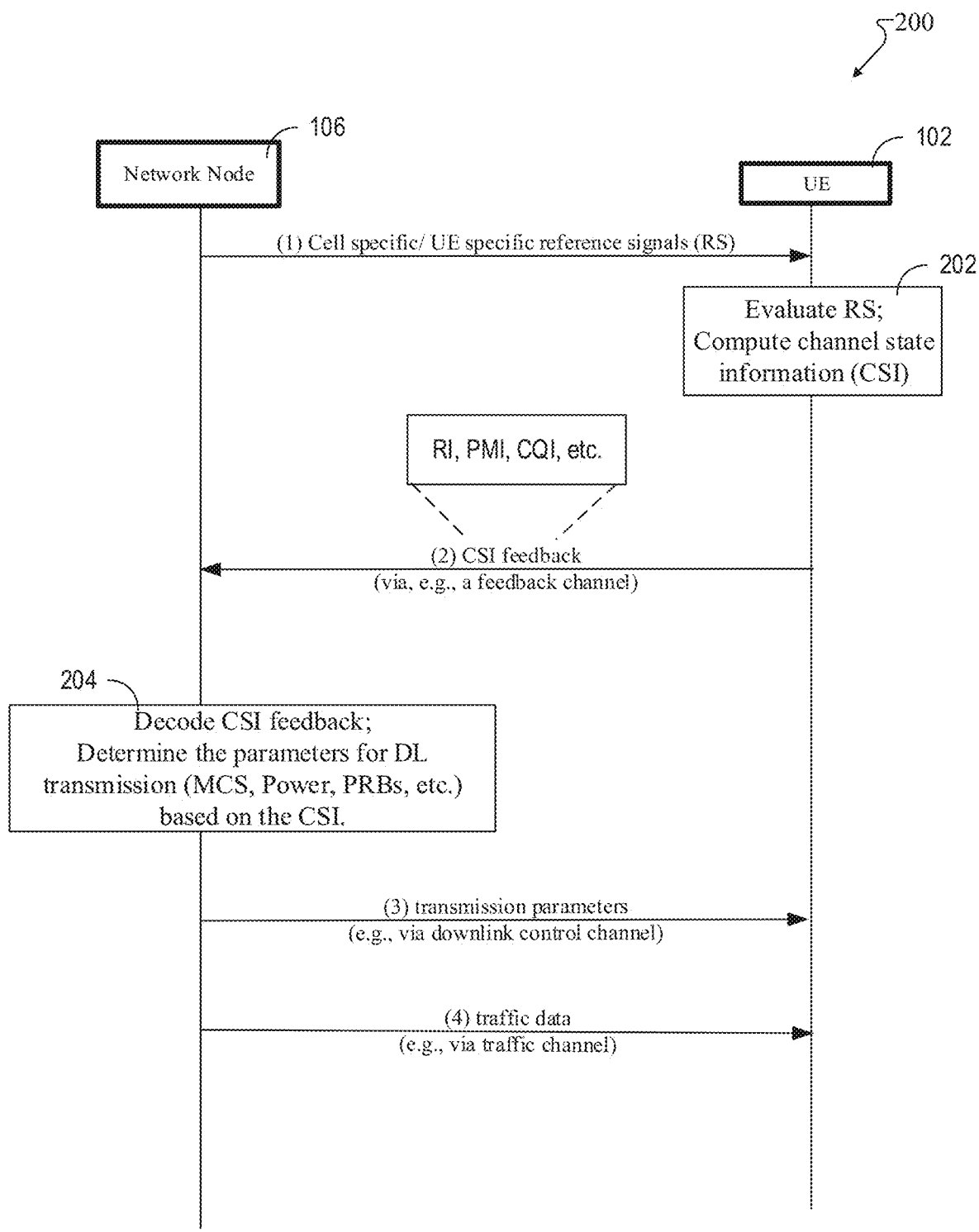
FIG. 2 illustrates an example schematic system block diagram of a message sequence chart between a network node and UE according to one or more embodiments.

Referring now to FIG. 2, illustrated is an example schematic system block diagram of a message sequence chart between a network node and user equipment according to one or more embodiments.

FIG. 2 depicts a message sequence chart for downlink data transfer in 5G systems 200. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 3:
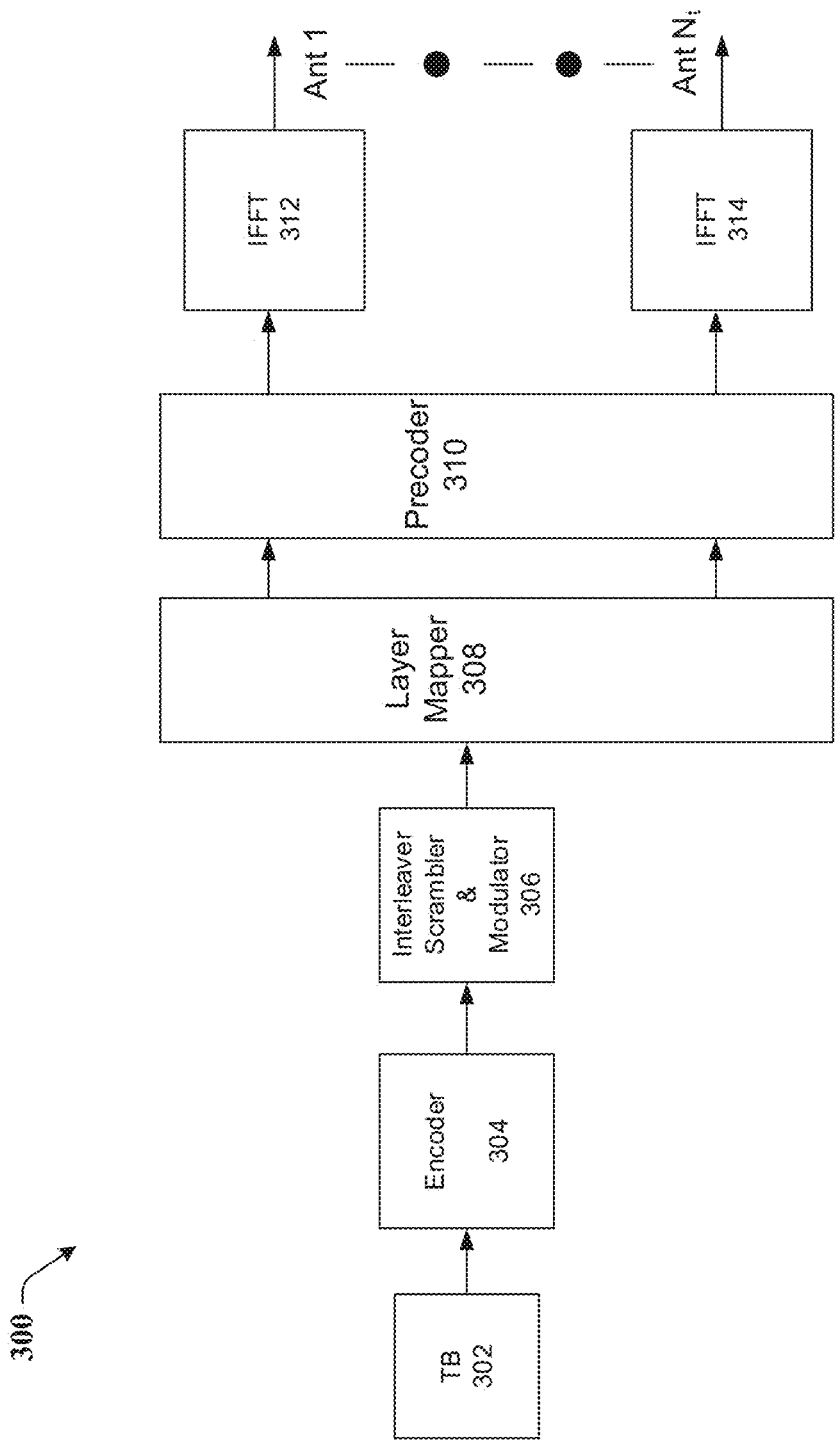
FIG. 3 illustrates an example schematic system block diagram of a coding chain for a physical downlink shared channel transmitter according to one or more embodiments.

Referring now to FIG. 3, illustrated is an example schematic system block diagram of a coding chain for a physical downlink shared channel transmitter according to one or more embodiments.

FIG. 3 depicts the transmission side of a MIMO communication system 300 with $N_t$ transmit antennas. The number of transport blocks 302 can be equal to one or more based on a number of layers. If the number of layers is more than 4, then 2 transport blocks can be transmitted. Cyclic redundancy check (CRC) bits can be added to each transport block and passed to a channel encoder 304. Low-density parity check codes (LDPC) can be used for forward error correction (FEC) in NR. The channel encoder 304 can add parity bits to protect the data. After encoding, the data stream can be scrambled with user-specific scrambling and passed through an interleaver scrambler and modulator 306.

The interleaved data can be passed through a layer mapper 308 to a precoder 310. The resultant data streams can then be passed through an inverse fast Fourier transform (IFFT) block 312, 314. It should be noted that in some systems, the IFFT block may not be necessary and can be dependent on the multiple access system. The encoded stream can then be transmitted through the respective antenna.

Figure 4:
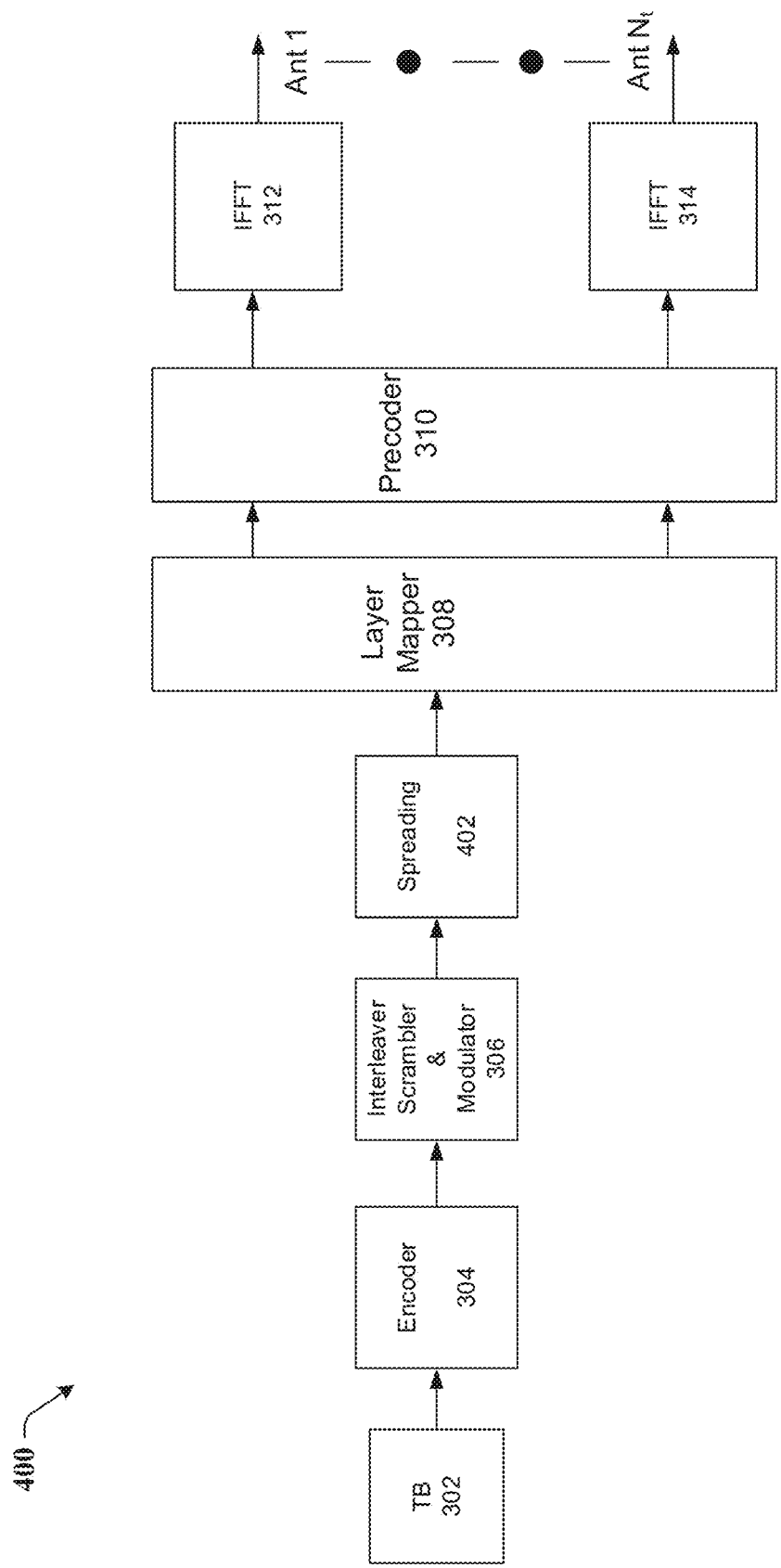
FIG. 4 illustrates an example schematic system block diagram of an uplink transmitter for a non-orthogonal multiple access system according to one or more embodiments.

Referring now to FIG. 4, illustrated is an example schematic system block diagram of an uplink transmitter for a non-orthogonal multiple access system according to one or more embodiments. Repetitive description of like elements employed in other embodiments described herein is omitted for sake of brevity.

Figure 5:
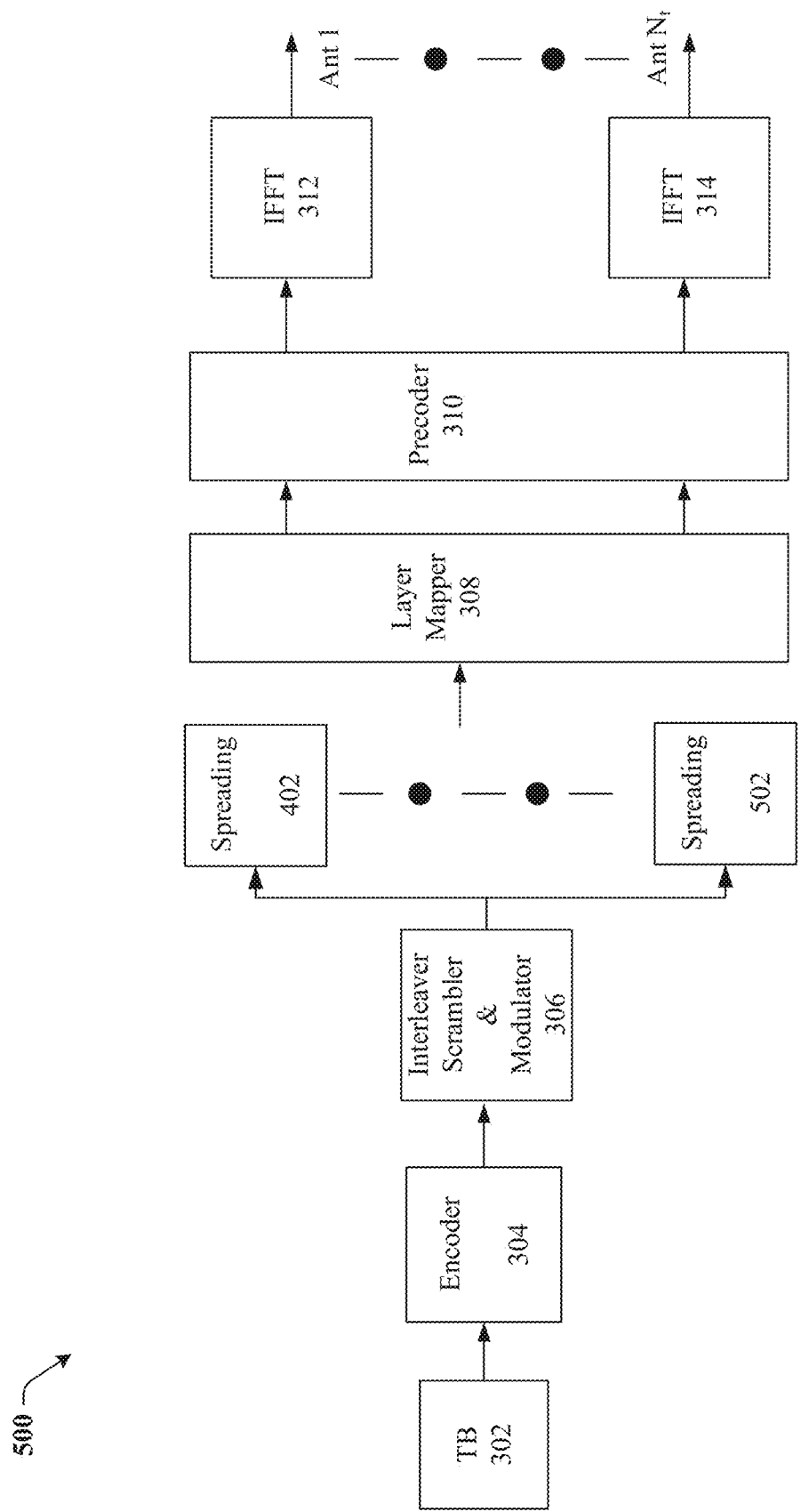
FIG. 5 illustrates an example schematic system block diagram of an uplink transmitter for a non-orthogonal multiple access system comprising multiple spreaders according to one or more embodiments.

FIG. 4 depicts a spreader use for one UE. However, as later shown, FIG. 5 depicts a use for multiple UEs due to the multiple spreaders blocks. Consequently, spreading codes can have zero, low, or high correlations with other spreading codes. FIG. 4 can comprise all of the blocks of FIG. 3 and a spreading block 402. Furthermore, FIG. 4 depicts the transmission side of a NOMA system 400 with code domain spreading. The spreading block 402 can differentiate UEs by using different spreading codes. The spreading codes can be taken from Hadamard family of codes, (e.g., codes which satisfy a Welch bound, etc.). Since the UEs can be differentiated in one domain, some UE's data can be detected correctly with a minimum mean square error estimation (MMSE) receiver. For example, a UE nearer to a cell center can pass even with interference from farther UEs in a typical NOMA scenario.

Referring now to FIG. 5, illustrated is an example schematic system block diagram of an uplink transmitter for a non-orthogonal multiple access system 500 comprising multiple spreaders according to one or more embodiments. Repetitive description of like elements employed in other embodiments described herein is omitted for sake of brevity.

FIG. 5 comprises an additional spreading block 502, in relation to FIG. 4. Rather than allocating only one spreading code for a given UE, as depicted in FIG. 4, the signal can be spread with multiple spreading codes from spreading blocks 402, 502, which can be orthogonal in nature or having low cross-correlation properties. Thus, multiple spreading blocks 402, 502 comprising low cross-correlation properties can reduce the interference between the UEs multiplexed on the resources. Consequently, the data symbols can be protected more as the probability of packet loss, due to interference from another UE, is less when the data is spread with multiple codes.

As opposed to FIG. 4, multiple spreading code blocks 402, 502 can protect the data from the interference. Thus, in one or more embodiments, the spreading codes can be orthogonal for a given UE (e.g., assigned codes to the UE are orthogonal). Additionally, in another one or more embodiments, the codes assigned to the UE can satisfy the Welch inequality of low cross-correlation properties. Furthermore, in yet another one or more embodiments, the length of the spreading codes assigned to a given UE can be of equal length or of a different length.

A given spreading code can be allocated from a Welch code for a first UE. However, for a second UE, a different set of Welch codes that have a low cross-correlation to the given spreading codes can be used. The UE can know the number of spreading codes and/or the spreading factor based on pre-defined data, which can be shared between the UE and the gNode B. These signals can be indicated in a downlink channel and/or a radio resource channel. Thus, when the UE receives this information, the UE can transmit according to FIG. 5 using multiple spreading codes. To initiate the process, the UE can transmit a reference signal, which channel data can be determined from. Consequently, spreading codes can be based on the amount of data to be transmitted by the UE. For example, a first UE seeking to transmit less data than a second UE, can use a lower number of spreading codes than the second UE. Thus, the spreading codes and spreading code factors can be based on the amount of data to be transmitted by the UE.

Figure 6:
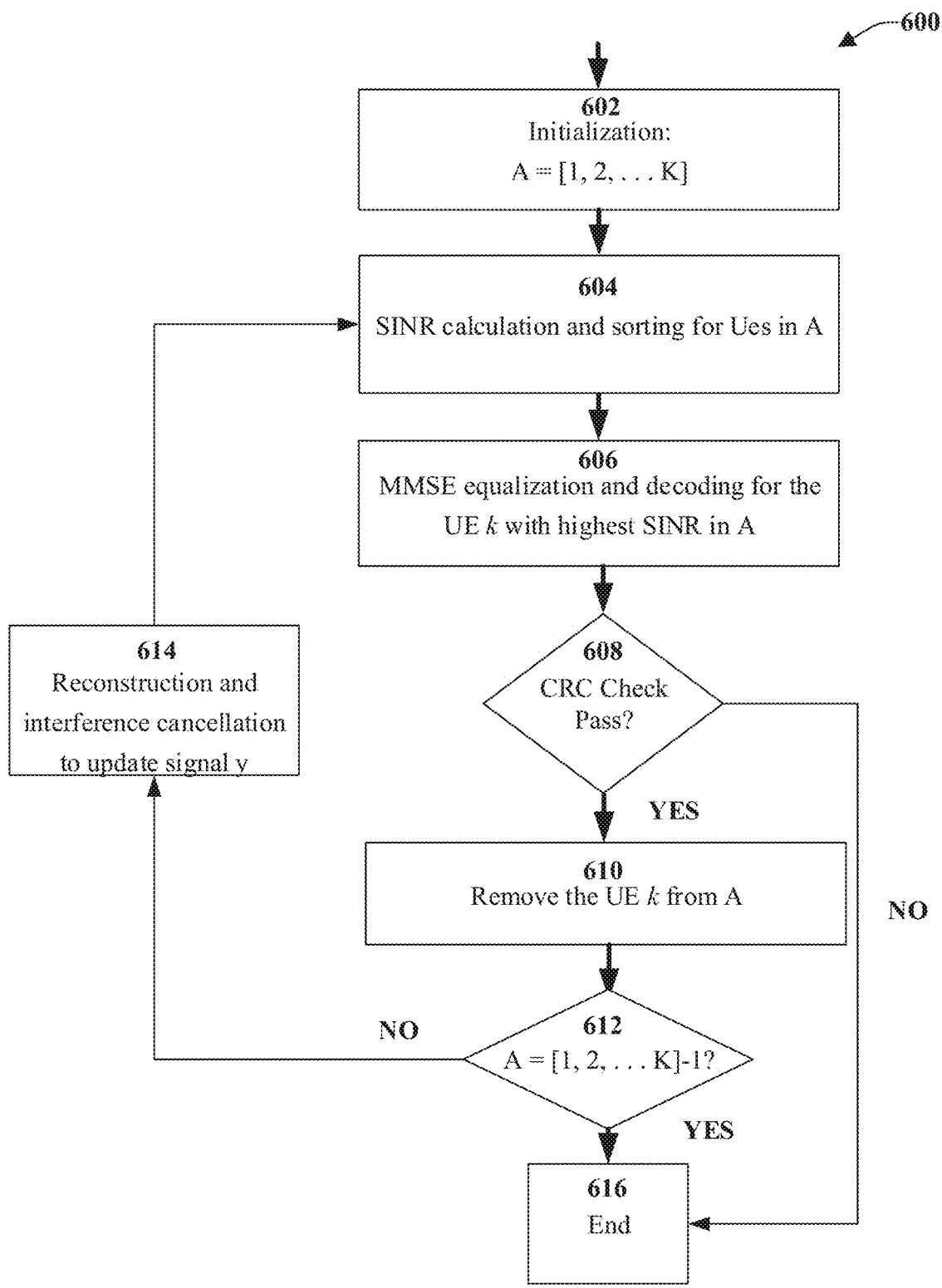
FIG. 6 illustrates an example flow diagram for minimum mean square error estimation successive interference cancellation for a non-orthogonal multiple access system according to one or more embodiments.

Referring now to FIG. 6, illustrated is an example flow diagram for minimum mean square error estimation successive interference cancellation for a non-orthogonal multiple access system according to one or more embodiments.

The receiver can attempt to detect the UEs by subtracting the interference from the received signal as represented by FIG. 6. Block 602 can receive a signal y, where K UEs are utilizing multiple spreading codes. Thereafter, UEs receiving the signals can be sorted based on their SINRs being computed/calculated and/or the various number of signals received by the UEs at block 604. At block 606, MMSE equalization and decoding can be performed for the signal of the UE with the highest SINR as determined by block 604. At block 608, if the signal passes a CRC, then the UE with the highest SINR can be removed from the list A at block 610. Thus, at block 612, it can be determined whether the UE has been removed by determining if A=A−1. If the UE has been removed, then the process can end at block 616. However, if the UE has not been removed, then the signal y can be reconstructed and undergo interference cancelation at block 614. Thereafter, the reconstructed signal y output from block 614 can be sent to block 604 to have a new SINR computation of the UE's signals performed. Alternatively, if the CRC check fails, then the process can automatically end at block 616 because if the signal with the highest SINR fails, then the remaining signals can fail also.

Figure 7:
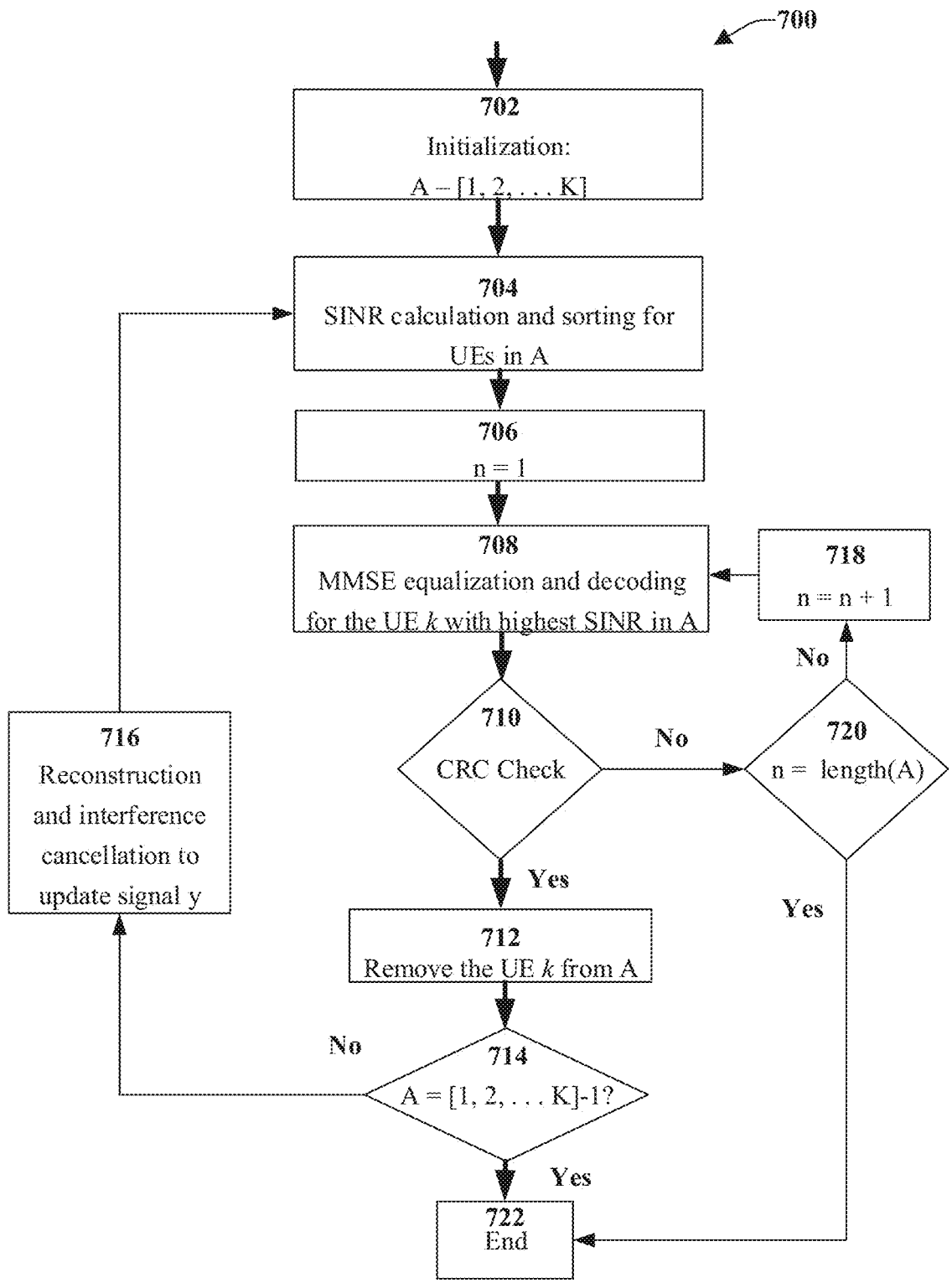
FIG. 7 illustrates an example flow diagram for minimum mean square error estimation successive interference cancellation for a non-orthogonal multiple access system according to one or more embodiments.

Referring now to FIG. 7, illustrated is an example flow diagram for minimum mean square error estimation successive interference cancellation for a non-orthogonal multiple access system according to one or more embodiments. The receiver can attempt to detect the UEs by subtracting the interference from the received signal as represented by FIG. 7.

Block 702 can receive a signal y, where K UEs are utilizing multiple spreading codes. Thereafter, UEs receiving the signals can be sorted based on their SINRs being computed/calculated and/or the various number of signals received by the UEs at block 704. For the first time the process runs, n can be set to equal one at block 706 for the highest SINR. At block 708, MMSE equalization and decoding can be performed for the signal of the UE with the highest SINR as determined by block 704. At block 710, if the signal passes a CRC, then the UE with the highest SINR can be removed from the list A at block 712. Thus, at block 714, it can be determined whether the UE has been removed by determining if A=A−1. If the UE has been removed, then the process can end at block 722. However, if the UE has not been removed, then the signal y can be reconstructed and undergo interference cancelation at block 716. Thereafter, the reconstructed signal y output from block 716 can be sent to block 704 to have a new SINR computation of the UEs signals performed. Alternatively, if the CRC check fails at block 710, then the process can try to decode the signal for the UE with the second highest SINR to determine if any of the UEs can pass the CRC. Therefore, the process can proceed to block 720 where it can be determined if n now equals the length of list A. If n does equal the length of list A, then the CRC check has been performed for all of the UEs and the process can proceed to terminate at end block 722. However, if n does not equal the length of A, then the process can proceed to block 718 where n can equal n plus 1 to trigger an additional MMSE equalization and decoding to be performed for the signal of the UE with the next highest SINR prior to another CRC check being performed, respectively.

Figure 8:
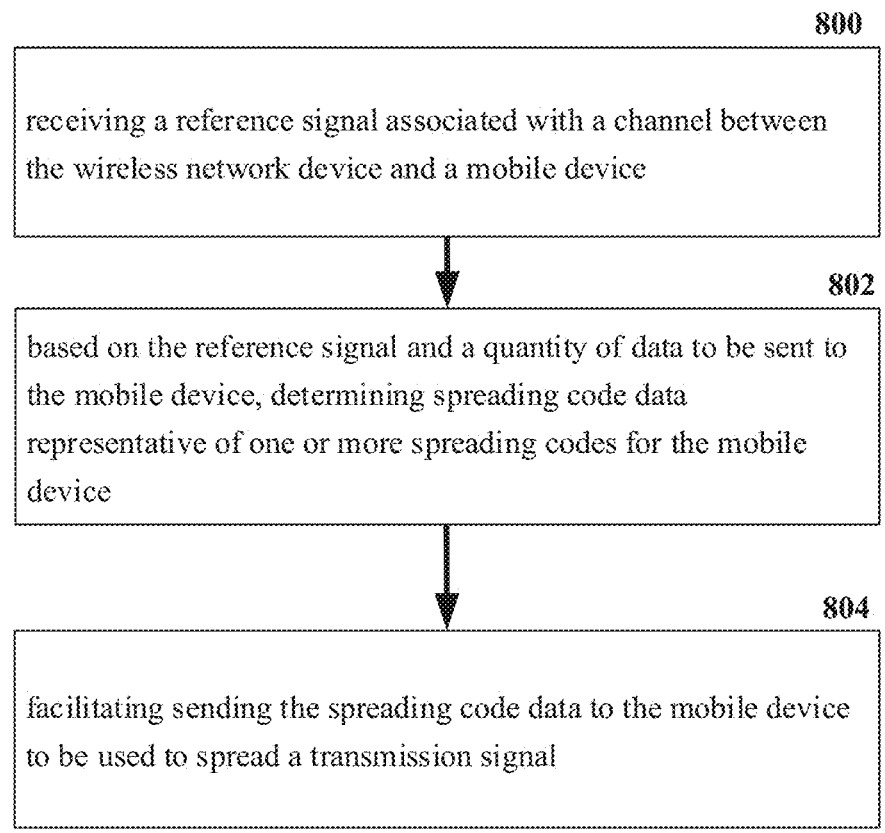
FIG. 8 illustrates an example flow diagram for a method for a non-orthogonal multiple access system for a 5G network according to one or more embodiments.

Referring now to FIG. 8, illustrated is an example flow diagram for a method for a non-orthogonal multiple access system for a 5G network according to one or more embodiments. At element 800, a method can comprise receiving a reference signal associated with a channel between the wireless network device 104 and a mobile device 102. Based on the reference signal and a quantity of data to be sent to the mobile device, at element 802, the method can comprise determining spreading code data (e.g., via the spreader 402, 502) representative of one or more spreading codes for the mobile device 102. Additionally, the method can comprise facilitating sending the spreading code data to the mobile device 102 to be used to spread a transmission signal at element 804.

Figure 9:
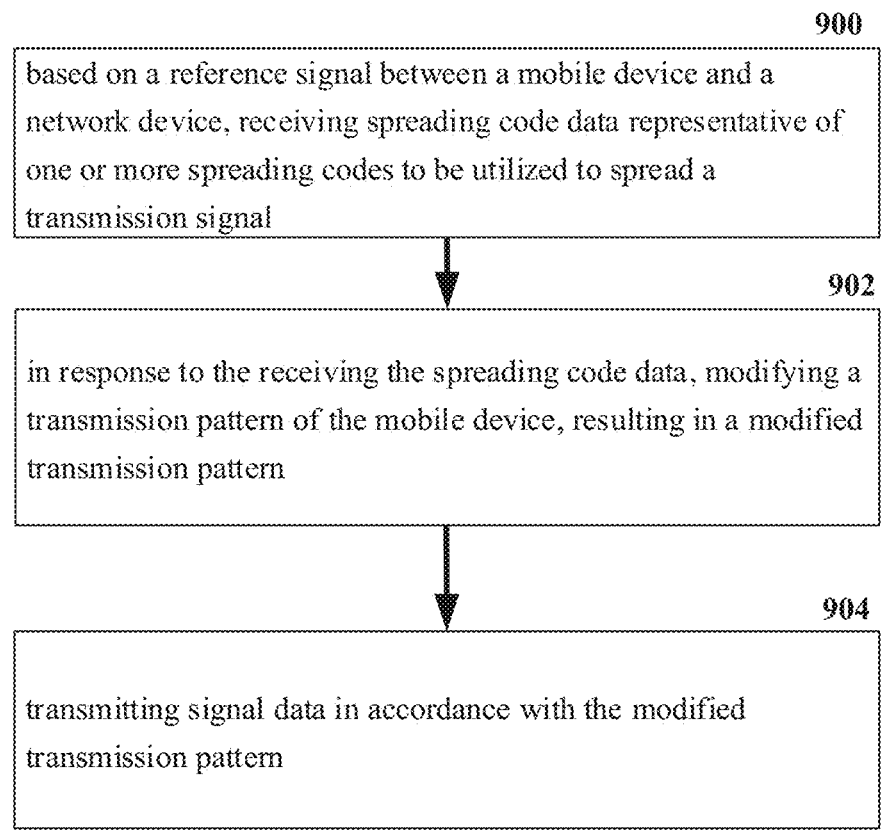
FIG. 9 illustrates an example flow diagram for a system for non-orthogonal multiple access for a 5G network according to one or more embodiments.

Referring now to FIG. 9, illustrated is an example flow diagram for a system for non-orthogonal multiple access for a 5G network according to one or more embodiments. Based on a reference signal between a mobile device 102 and a network device 104, a system can facilitate, receiving spreading code data (e.g., via the mobile device 102) representative of one or more spreading codes to be utilized to spread a transmission signal at element 900. In response to the receiving the spreading code data, the system can modify a transmission pattern of the mobile device 102, resulting in a modified transmission pattern at element 902. Furthermore, the system operations can comprise transmitting signal data (e.g., via the mobile device 102) in accordance with the modified transmission pattern at element 904.

Figure 10:
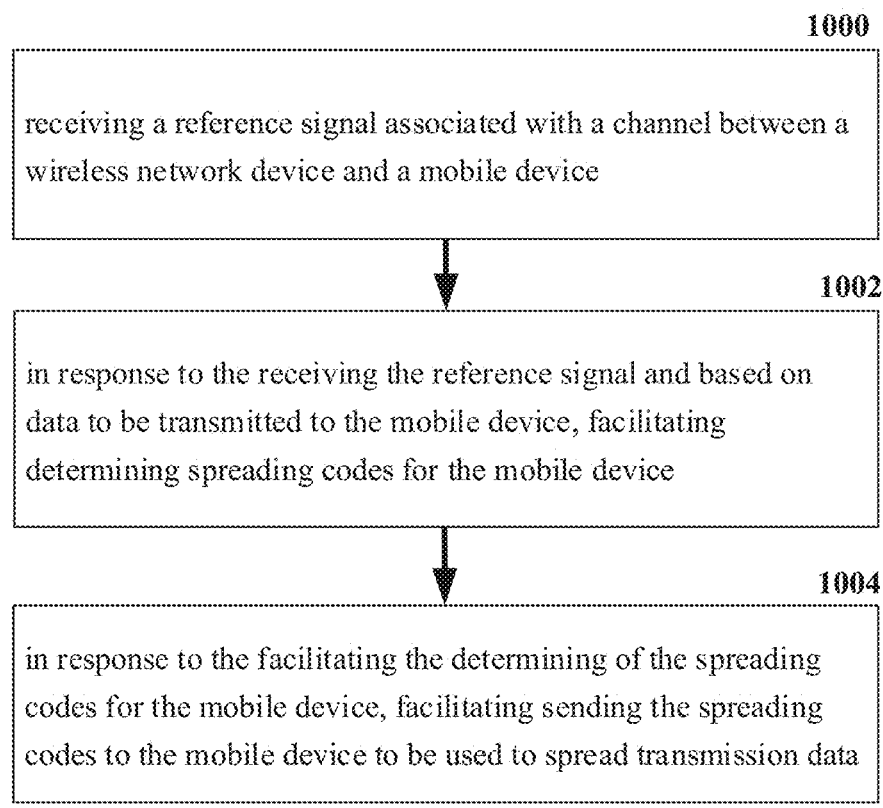
FIG. 10 illustrates an example flow diagram for a machine-readable medium for a non-orthogonal multiple access system for a 5G network according to one or more embodiments.

Referring now to FIG. 10, illustrated is an example flow diagram for a machine-readable medium for a non-orthogonal multiple access system for a 5G network according to one or more embodiments. At element 1000 a machine-readable storage medium can perform the operations comprising receiving a reference signal associated with a channel between a wireless network device 104 and a mobile device 102. In response to the receiving the reference signal and based on data to be transmitted to the mobile device 102, at element 1002 the machine-readable storage medium operations can comprise facilitating determining spreading codes (e.g., via the spreader 402, 502) for the mobile device 102. Additionally, in response to the facilitating the determining of the spreading codes for the mobile device, the machine-readable storage medium can facilitate sending the spreading codes to the mobile device 102 to be used to spread transmission data at element 1004.

Figure 11:
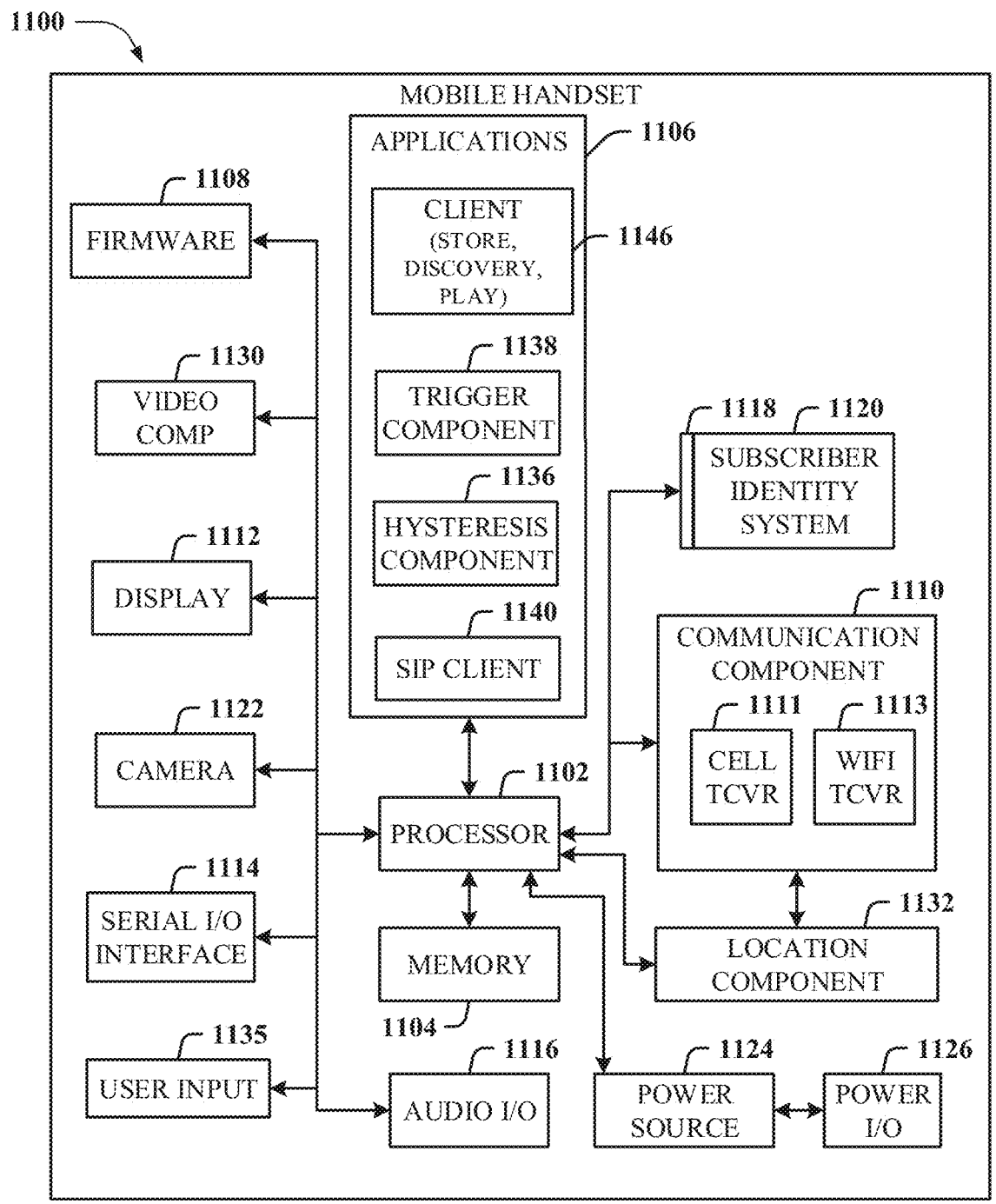
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
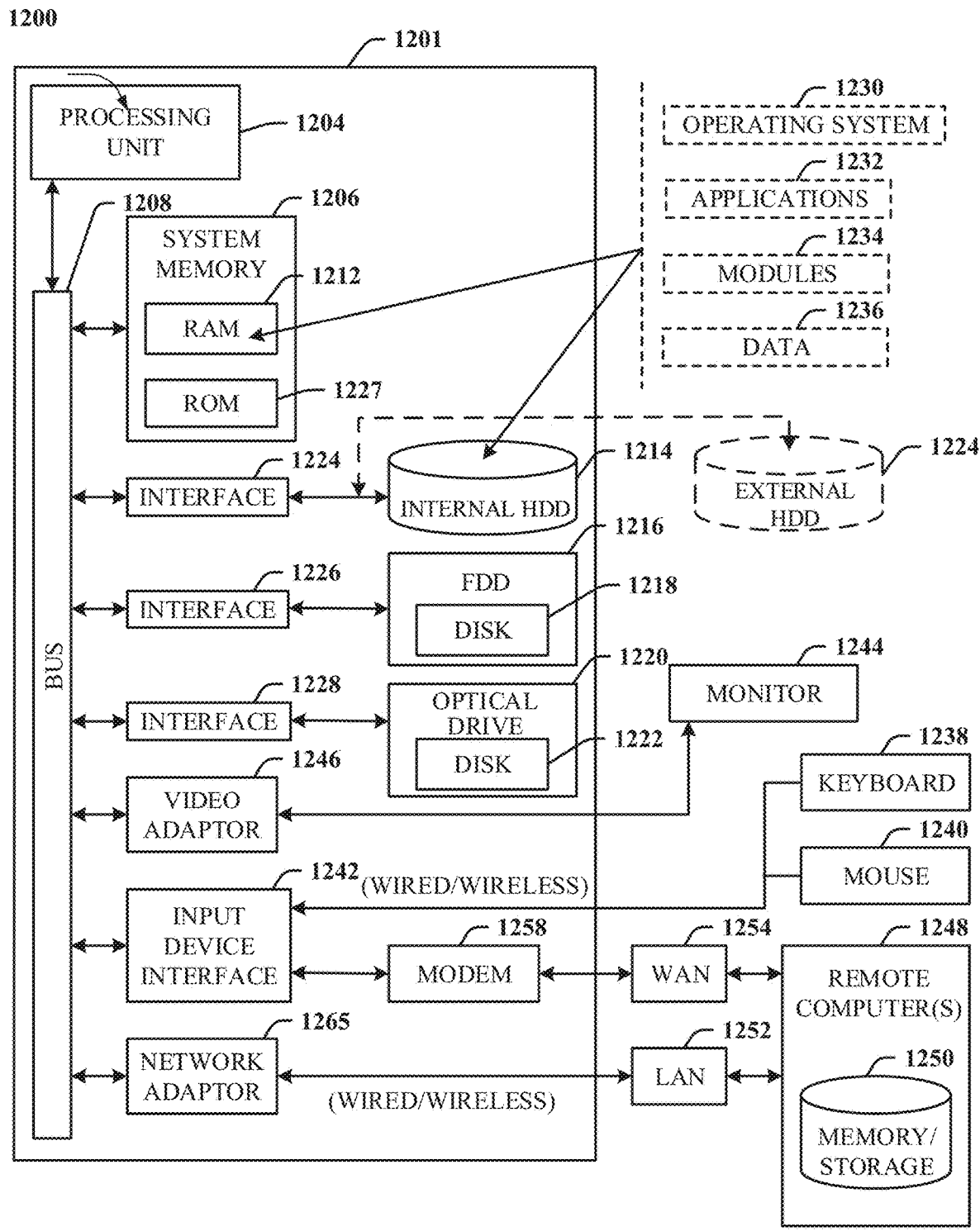
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

In general, the gains with NOMA can be high when the chosen codes are orthogonal as the interference from other UEs can be zero. However, orthogonal codes are not possible for every length. Thus, codes that have a low cross-correlation property can be used. However, when the number of UEs are large, the cross-correlation between the codes can cause interference to the UEs transmitting data on the same resources. This, in turn, reduces the gains of the NOMA system, which reduces the overall throughput. Hence, an efficient solution for transmitting data on the same resources in NOMA system can be useful.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
based on a quantity of data to be sent to a mobile device and a reference signal associated with a channel between network equipment, comprising a processor, and the mobile device, determining, by the network equipment, spreading code data representative of a spreading code for the mobile device;
facilitating, by the network equipment, sending the spreading code data to the mobile device to be used to spread a transmission signal; and
in response to facilitating the sending of the spreading code data and after the mobile device applied the spreading code data to the transmission signal resulting in a spread transmission signal, receiving, by the network equipment from the mobile device, transmission data representative of the spread transmission signal.

2. The method of claim 1, further comprising:
sending, by the network equipment, spreading factor data representative of a spreading factor to be utilized by the mobile device.

3. The method of claim 1, further comprising:
sending, by the network equipment, spreading factor data representative of a spreading factor via a radio resource control signal.

4. The method of claim 1, wherein sending the spreading code data to the mobile device comprises sending the spreading code data to the mobile device via a radio resource control signal.

5. The method of claim 1, wherein the spreading code data is first spreading code data representative of a first spreading code, and wherein facilitating the sending comprises facilitating sending second spreading code data representative of a second spreading code, of a same length as the first spreading code, to the mobile device.

6. The method of claim 1, wherein the spreading code data is first spreading code data representative of a first spreading code, and wherein facilitating the sending comprises facilitating sending second spreading code data representative of a second spreading code, of a different length than the first spreading code, to the mobile device.

7. The method of claim 1, further comprising:
receiving, by the network equipment, the reference signal prior to the determining the spreading code data.

8. The method of claim 1, further comprising,
determining, by the network equipment, that a spreading factor has been previously sent to the mobile device via a downlink control channel.

9. A system, comprising:
a processor; and
a memory that stores executable instructions that, when executed by the processor, facilitate performance of operations, comprising:
   based on a reference signal between a mobile device and network equipment, receiving spreading code data representative of spreading codes to be utilized to spread a transmission signal;
   modifying a transmission pattern of the mobile device, resulting in a modified transmission pattern;
   transmitting signal data in accordance with the modified transmission pattern; and
   in response to transmitting the signal data and the mobile device having applied the transmission pattern, receiving transmission data representative of the mobile device having been determined to have spread the transmission signal.

10. The system of claim 9, wherein the operations further comprise:
   receiving spreading factor data, representative of a spreading factor, associated with the spreading codes to be used to transmit the signal data.

11. The system of claim 10, wherein the spreading factor is a first spreading factor, and wherein a second spreading factor is previously received prior to the first spreading factor by the mobile device.

12. The system of claim 9, wherein the spreading codes comprise a first spreading code, wherein the spreading code data is first spreading code data, and wherein the operations further comprise:
   receiving second spreading code data representative of a second spreading code of equal length to the first spreading code.

13. The system of claim 9, wherein the spreading codes comprise a first spreading code, wherein the spreading code data is first spreading code data, and wherein the operations further comprise:
   receiving second spreading code data representative of a second spreading code having a different length than the first spreading code.

14. The system of claim 13, wherein the second spreading code data is received via a radio resource control signal.

15. A non-transitory machine-readable storage medium, comprising executable instructions that, when executed by a processor, facilitate performance of operations, comprising:
   in response to receiving a reference signal associated with a channel between network equipment and a mobile device and based on data to be transmitted to the mobile device, obtaining spreading codes for the mobile device;
   in response to obtaining the spreading codes for the mobile device, facilitating sending the spreading codes to the mobile device to be used to spread transmission data; and
   in response to the sending of the spreading codes and after the mobile device has been determined to have spread the transmission data, receiving spreading data representative of the mobile device having spread the transmission data.

16. The non-transitory machine-readable storage medium of claim 15, wherein the operations further comprise:
   receiving the reference signal prior to the obtaining the spreading codes for the mobile device.

17. The non-transitory machine-readable storage medium of claim 15, wherein the operations further comprise:
   facilitating utilizing the spreading codes to spread the transmission data.

18. The non-transitory machine-readable storage medium of claim 15, wherein the spreading codes are of equal length.

19. The non-transitory machine-readable storage medium of claim 15, wherein the spreading codes are of unequal length.

20. The non-transitory machine-readable storage medium of claim 15, wherein the spreading codes are orthogonal spreading codes.

* * * * *